United States Patent [19]

Thompson, Jr.

[11] Patent Number: 5,517,201

[45] Date of Patent: May 14, 1996

[54] GAME ALERT SYSTEM

[76] Inventor: Everett E. Thompson, Jr., 4305 Dixon Rd., Macon, Ga. 31206

[21] Appl. No.: 139,261

[22] Filed: Oct. 19, 1993

[51] Int. Cl.$^6$ ................................................ G01S 5/02
[52] U.S. Cl. ................ 342/417; 250/341.1; 250/339.14; 340/557; 340/573
[58] Field of Search ................ 342/417; 250/341.1, 250/338.1, 339.14; 340/565, 552, 555, 573, 557

[56] References Cited

U.S. PATENT DOCUMENTS

| | | | |
|---|---|---|---|
| 3,965,355 | 6/1976 | Maccabee et al. | 250/341 |
| 4,399,432 | 8/1983 | Lunn . | |
| 4,615,524 | 10/1986 | Goodrich . | |
| 4,748,601 | 5/1988 | Reidt et al. . | |
| 4,903,009 | 2/1990 | D'Ambrosia et al. | 340/556 |
| 5,121,367 | 6/1992 | Rose . | |
| 5,128,548 | 6/1992 | Goodson et al. . | |

OTHER PUBLICATIONS

*Whitetail Bowhunter Magazine*, Article entitled "Hunter Alert System" Fall 1993 issue.

Primary Examiner—Gregory C. Issing
Assistant Examiner—Dao L. Phan
Attorney, Agent, or Firm—Clifford A. Poff

[57] ABSTRACT

A plurality of monitors are distributed throughout a surveillance area chosen in the wild habitat of animals by a sportsman. Each monitor transmits at least one infrared signal to the surveillance area. An animal intersected the beam reflects incident radiation on a detector situated in the same housing as the transmitter. When the signal is detected, an RF transmitter is energized for detection at a remote site by an RF receiver. The RF receiver includes a clock for establishing the date and time of the transmitted signal. In the preferred embodiment, each monitor is provided with three (3) infrared transmitters, each with an associated receiver. The transmitters are driven by encoded signals that uniquely identify each transmitter of the monitor as well as the transmitters of all other monitors that may be in use thereby to enable detected directional movement in the surveillance area. The receiver includes a decoder for establishing the identity of the received RF signal. The storage medium is used to allow recovery of detected events through a read command.

8 Claims, 4 Drawing Sheets

GAME ALERT SYSTEM

BACKGROUND OF THE INVENTION

1. Field of the Invention

The present invention relates to a surveillance system to indicate the presence of wild animals within a surveillance area defined by detected infrared radiation that is radiated and detected by the same monitor. More particularly, the present invention relates to such a system wherein the plurality of such monitors contains not only the infrared emitter and detector, but also a RF transmitter for allowing a determination including recordation of the presence of animals, for example, a game animal within the surveillance area throughout a period a time without the actual presence of a human to thereby avoid disturbing the animals and leaving tail tale scent or other disturbances which might have an adverse effect to the wild habitat of the surveillance area.

2. Description of the Prior Art

In the natural habitat of wild animals, man's presence usually brings about a self-defensive reaction of flight by most animals to a different location. It is not practical to camouflage a person desiring to conceal their presence in habitat of wild life. Monitoring the movement of game by sportsman is a common practice well known in history. The desire to monitor the movements of animals in the natural habitat is shared not only persons desiring to conduct studies of nature but also sportsmen. The present invention is equally operable to both hunters and naturalists including conservationist. They have long been aware that deer and other animals are creatures of habit since, for example, the animals instinctively follow trails that link their movement patterns during bedding, feeding, watering or "in the rut" and as such the animals behave according to predictable patterns. Other creatures in nature are known to sportsman, particularly tournament bass fisherman who also capitalize by eliminating unproductive waters by use of graph recorders.

Devices are known in the art for monitoring and recording the movement of large game animals, such as deer. In U.S. Pat. No. 5,128,548 there is disclosed a large game monitoring and recording device which transmits a laser beam between two points and records the time and date the beam was broken. The device is used for determining game trails. U.S. Pat. Nos. 4,615,624; 4,748,601; and 5,121,367 disclose game trail monitors designed to record time and direction of the game passing through an area. U.S. Pat. No. 5,121,367 discloses a trip line which is connected to a pull pin and exerts a direct pull on the pin when engaged by a passing animal so that the position of the pin when pulled free indicates the direction the animal was traveling. A trip line detecting system suffers from the disadvantage that once a passing animal trips the line and the pull pin is pulled free, another animal in the same area will disturb the direction of the pulled pin thus giving erroneous information.

Such known systems for monitoring game trails suffer the disadvantage that the monitoring process requires the presence of the sportsman at the monitor or at each of the monitors, in the event of a plurality of monitors, to access the results when the monitor takes the form of a string traversing a suspected game trail. Only a single event can be recorded for discovery and at a later time by the sportsman. When the monitor involves the use of infrared energy, there is a common requirement that the sportsman access the results of the monitor at the suspected trail sight. Such monitors, whether of the string type or the infrared type, that provide surveillance of a trail are designed to only respond to activity along that suspected trail. In other words, an animal which may depart from the trail if only for a few feet is undetected.

Accordingly, it is an object of the present invention to provide a hunter with an alert signal advising the hunter of the presence of a game animal in a surveillance area which includes not only a suspected trail but surrounding areas by a transmitted radio signal from a receiver carrier remote to the surveillance site.

It is another object of the present invention to provide a system for monitoring the movement of game animals by providing at least one preferably a plurality of passive infrared motion detectors including an IR emitter and detector within a transportable housing also containing a transmitter than can be strategically place in a surveillance area to provide a radio frequency signal to a receiver indicative of the activity within the surveillance area of the monitor.

Another object of the present invention is to provide an apparatus to monitor a surveillance area for detecting the movement of game in which a monitor responsive to such movement emits an RF signal for detection by a receiver which in turn provides a signal that can be either audio or vision indicative of such activity in the surveillance area.

It is a further object of the present invention to provide a monitor for game in the wild habitat which can transmit by a RF medium to a receiver distantly situated from the surveillance area to receive and record alert signals from a monitor preferably a plurality of monitors: each such alert signal being tagged with identifying indicia such as the time, date, direction and monitor identification.

It is yet another object of the present invention to provide a monitor for the surveillance area for the natural habitat for the game in which a plurality of diversely directed and distinctively encoded infrared beams are emitted for detection of the presence and the direction of entrance of animals to the surveillance area.

SUMMARY OF THE INVENTION

According to the present invention there is provided an apparatus for recording the presence of the directional movement of IR reflecting animal in a surveillance area, said apparatus including the combination of at least one monitor including a transmitter for a radio frequency signal, said transmitter being responsive to a detected incident IR radiation reflected by the animal from an IR source in the monitor, a receiver responsive to a transmission of a radio frequency signal by said monitor for generating a corresponding electrical signal, said receiver further including means for displaying indicia corresponding to the occurrence of each transmission of a radio frequency signal by the transmitter, and means for controlling access to said electrical signal According to the present invention there is also provided an apparatus for remotely indicating the presence of an infrared reflective animal in a surveillance area, the apparatus including the combination of; at least one monitor including a transmitter for emitting a radio frequency signal within a predetermined surveillance area, the monitor further includes a detector responsive to incident IR radiation reflected by the animal in the surveillance area from the transmitter, a receiver responsive to a transmission of the radio frequency signal by the monitor for generating a corresponding electrical signal, the receiver further including indicia display means the electrical signal to indicate the occurrence of an animal in the surveillance area, and control means to allow operation of the indicia display means for controlling access to the electrical signal generated by the receiver.

BRIEF DESCRIPTION OF THE DRAWINGS

The present invention will be more fully understood when the following description is read in light of the accompanying drawings in which.

DETAILED DESCRIPTION OF THE DRAWINGS

Figure 1:
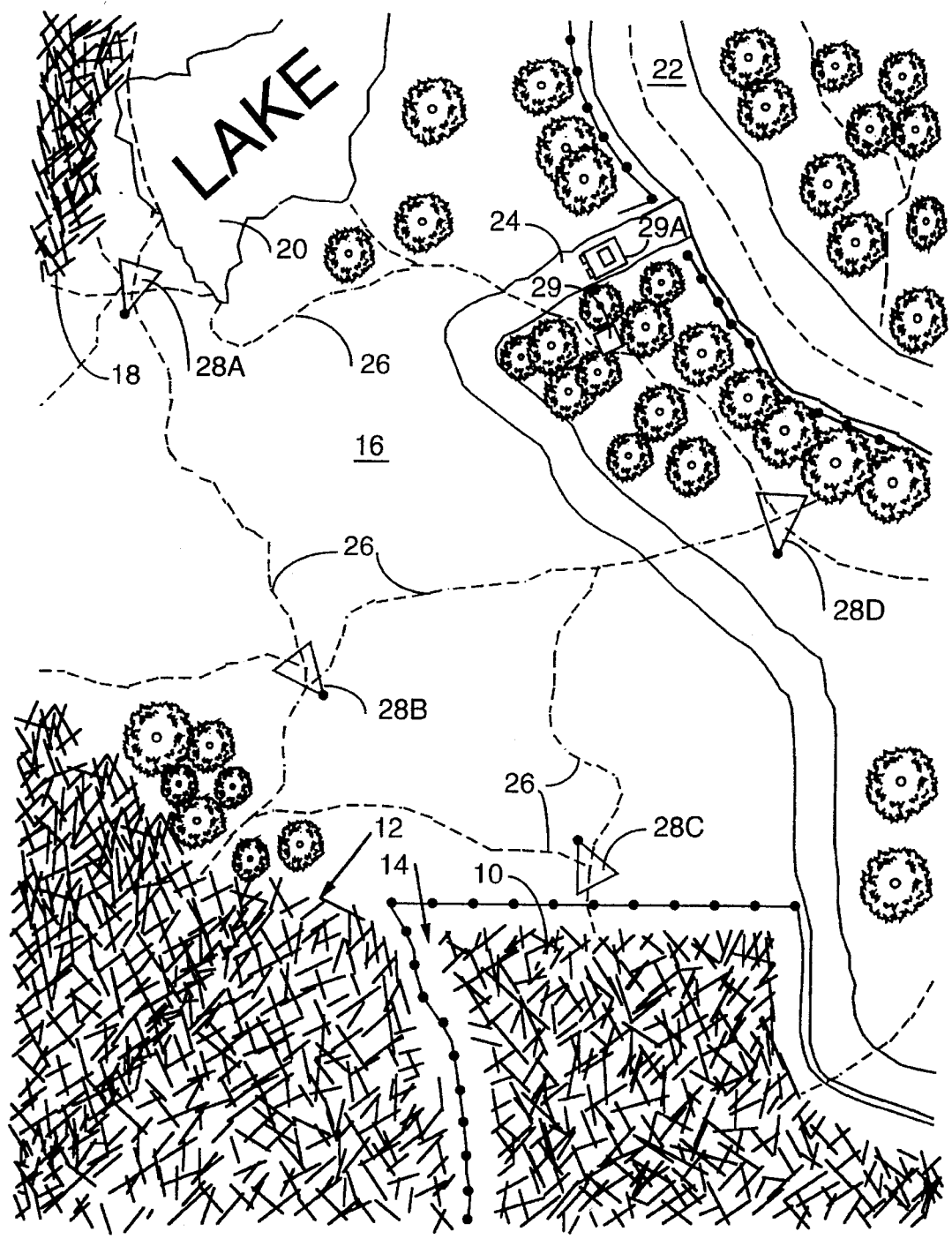
FIG. 1 is a pictorial illustration of a supposed hunting area in the natural habitat of game to be the subject of surveillance using the apparatus of the present invention.

In FIG. 1 there is illustrated a supposed area that is a natural habitat for wild game. Within the area it is expected that there will be wooded areas 10 and 12 separated by a fire trail 14. A clearing area 16 is bounded by the wooded areas 10 and 12 as well as a wooded area 18, lake 20 and a highway 22 serving a roadway 24. In FIG. 1 there is assumed game trails indicated by broken lines and identified by reference numeral 26. The game trails for the likely sites to monitor the movement patterns of game animals in the clearing area. It is to be understood that the movement of animals can be monitored in the wooded areas as well as cleared areas without departing from the spirit of the present invention. In the clearing area positioned one preferably a plurality of monitors 28A, 28B, 28C, 28D . . . 28N. There is also a receiver 29 that is protected from the elements by its own hermetically sealed housing, and as will be more fully explained hereinafter. There is a transportation vehicle 29A adjacent the surveillance area.

Figure 2:
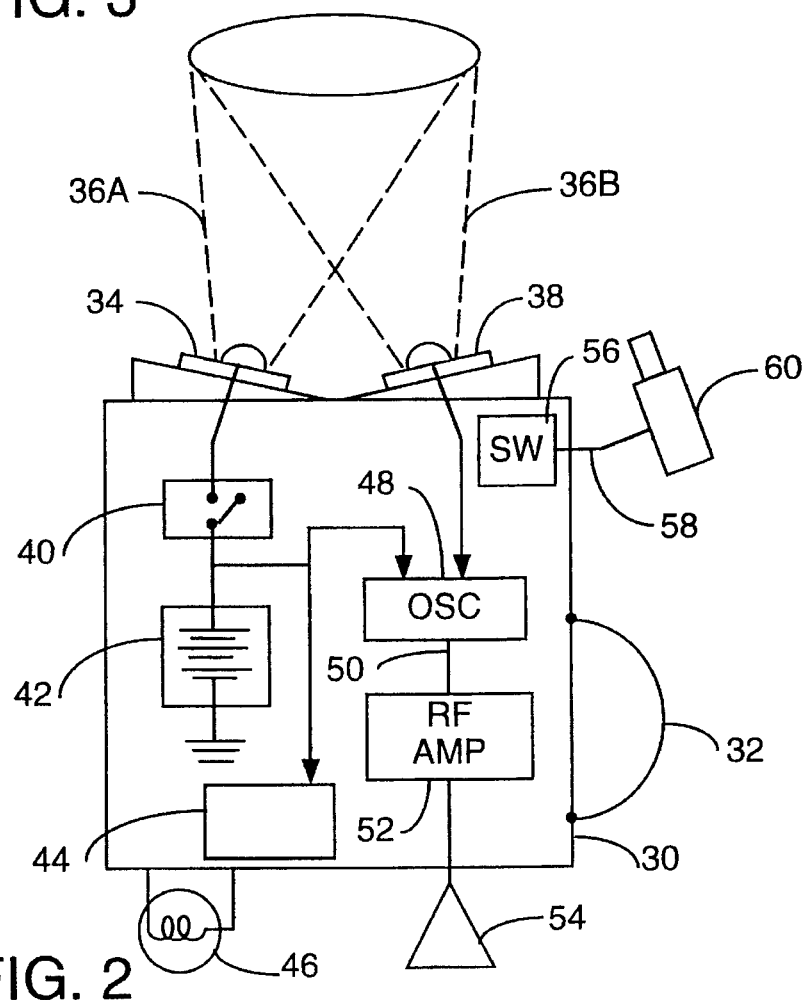
FIG. 2 is a diagrammatic illustration of one embodiment of monitor to be placed in a natural habitat of game.

The electrical circuitry for a simplified form of monitors is shown in FIG. 2 and includes a casing 30 having a mounting fixture 32 which can encircle a tree trunk or pole suitable situated adjacent a surveillance area that is now more suspected to be a game trail. The casing 30, which is made in a waterproof manner, has portal openings that allow the emission and detection of infrared radiation. For this purpose there is provided a IR emitter 34 constructed to provide a cone-shaped field 36A of infrared energy arranged to essentially traverse the game trail. A similarly cone-shaped field 36B of sensitivity is formed by a infrared detector 38 on which there impinges infrared energy reflected by an animal within the congruent areas of the cone-shaped fields 36A and 36B. Infrared energy is emitted by emitter 34 by circuitry that essentially includes an ON/OFF switch 40 which applies an electrical potential of a battery 42 to the infrared emitter. A detection circuit 44 energizes an indicator such as a LED 46 in response to a low battery condition of battery 42. The battery power applied to output of switch 40 is also applied to an oscillator 48 which receives an output signal from infrared detector 38 to produce a signal appearing on line 50 in response to a triggered output of the infrared detector 38. Signal on line 50 is applied to an RF amplifier 52 coupled to an antenna 54 for the transmission of a signal corresponding to the detective presence of an animal by detector 38. The signal appearing on line 50 is also applied to a switch 56 whose output appearing on line 58 is connected to a camera 60. The camera is preferably controlled as part of the operations of the monitor to provide a visual indication of the surveillance area when a reflected IR signal is detected by detector 38.

Figure 3:
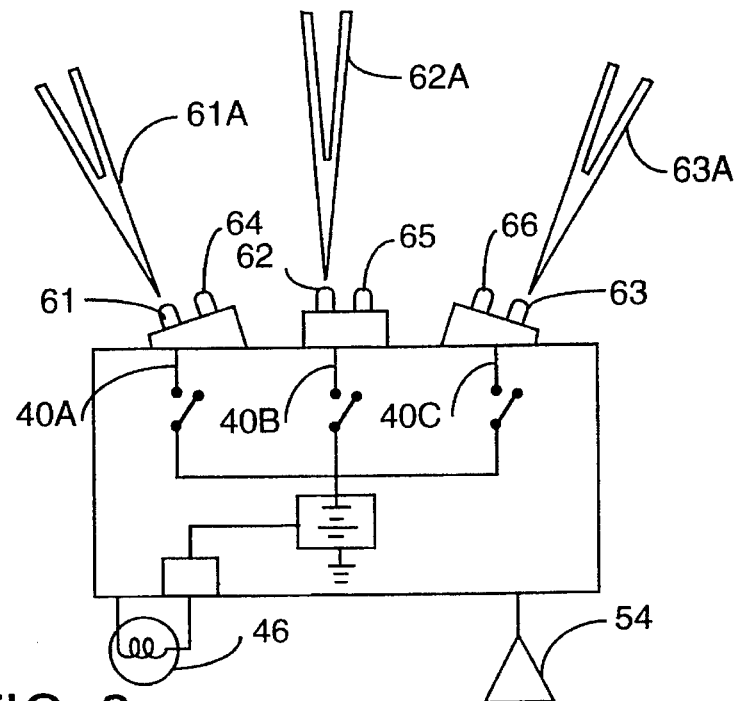
FIG. 3 is a preferred embodiment of a monitor to be placed in a natural habitat of game.

In FIG. 3 there is illustrated an array of infrared transmitters 61, 62 and 63 and associated infrared detectors 64, 65 and 66, respectively. The transmitters 61–63 are fitted with optical lenses, per se well known in the art, to focus the infrared emission to relatively narrow beams as diagrammatically illustrated in FIG. 3 as compared with the cone-shaped field 36A of the embodiment of FIG. 2. The infrared beams 61 and 63 served to detect the entrance of a game animal from opposite lateral sides of the center beam 62A which is designed to project outwardly beyond the projected length of beams 61A and 63A and serves to detect the presence of a game animal approaching the monitor in a direction between the surveillance areas by beams 61A and 63A. The use of the three (3) beams provides a unique way of indicating which direction a big game animal is traveling when it passes the trail monitors. As illustrated, each monitor has three (3) separate beams. Each beam has a separate code that when tripped is transmitted to the receiver. The receiver determines which direction the animal is traveling by the code received and logs the information along with the time, date and which monitor sent the information, as will be explained in greater detail hereinafter. The infrared emitters are controlled by an ON/OFF switches 40A, 40B and 40C, respectively. While not shown, it is to be understood that the outputs as they occur, from the detectors 64, 65 and 66 form inputs to an oscillator for a RF transmitter such as oscillator 48 shown and described in regard to FIG. 2.

Figure 4:
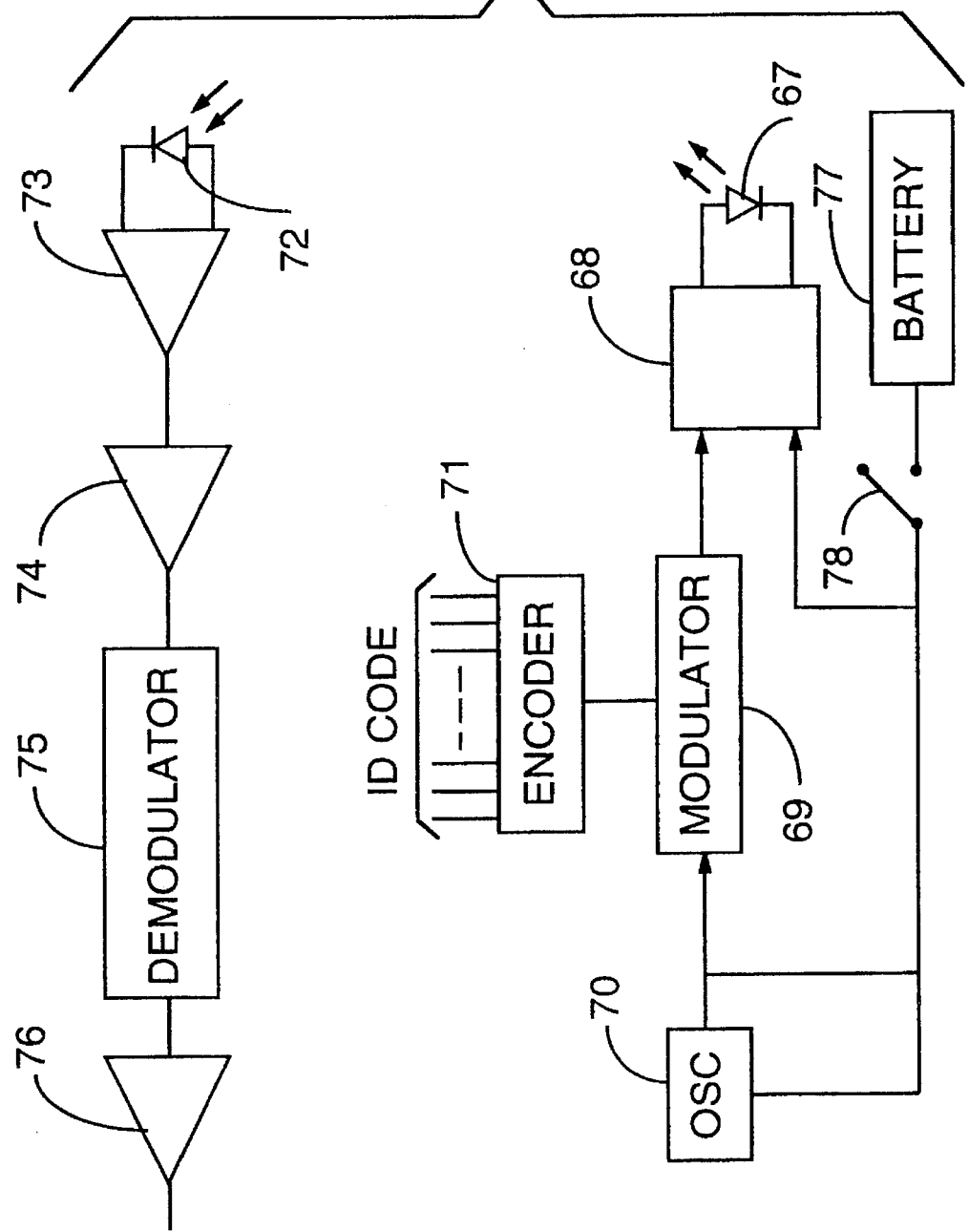
FIG. 4 is a diagrammatical illustration of the electrical circuitry for the monitor of FIG. 3.

FIG. 4 illustrates one well known arrangement for providing each beam with a separate code. Each of the infrared beams 61A, 62A and 63A and there associated infrared detectors 64, 65 and 66, respectively, can be coupled to associated circuitry according to the embodiment of FIG. 4 although the encoding of each beam will be unique among all the beams being served by the monitors. For the purpose of description only in FIG. 4, the light emitting diode 67 emits the desired infrared beam in response to the output of a driver circuit 68 which is supplied with the output of a modulator 69 that modulates a carrier wave produced by oscillator 70 with an encoded signal appearing at the output of encoder 71. The encoder has inputs such as dip switches that allow the selection of an unique binary code. The receiver section for the infrared beam reflected by an animal is includes a photodiode 72 whose output is amplified by a preamplifier 73 and further amplified by an amplifier 74 to provide a signal at a level suitable to form an input to a demodulator 75. The output from the demodulator 75 is fed to an amplifier 76 to provide an electrical signal at a suitable level to form an input for an oscillator of a radio frequency transmitter, such as oscillator 48 in the embodiment of FIG. 2. In FIG. 4 the electrical circuitry is supplied with power by battery 77 whose output terminal is provided with a switch 78 whereby the operation of the light emitting diode can be selectively controlled. Such control is particularly desirable when, for example, less than all the infrared beams in a given monitor are to be utilized for a particular purpose. In this regard, four monitors can be arranged at the corner points of a rectangular field and the beams arranged so as to detect movement of an animal into the field of surveillance.

Under these circumstances, it is undesirable to utilize the center beams of the various monitors as they may be deemed superfluous.

Figure 5:
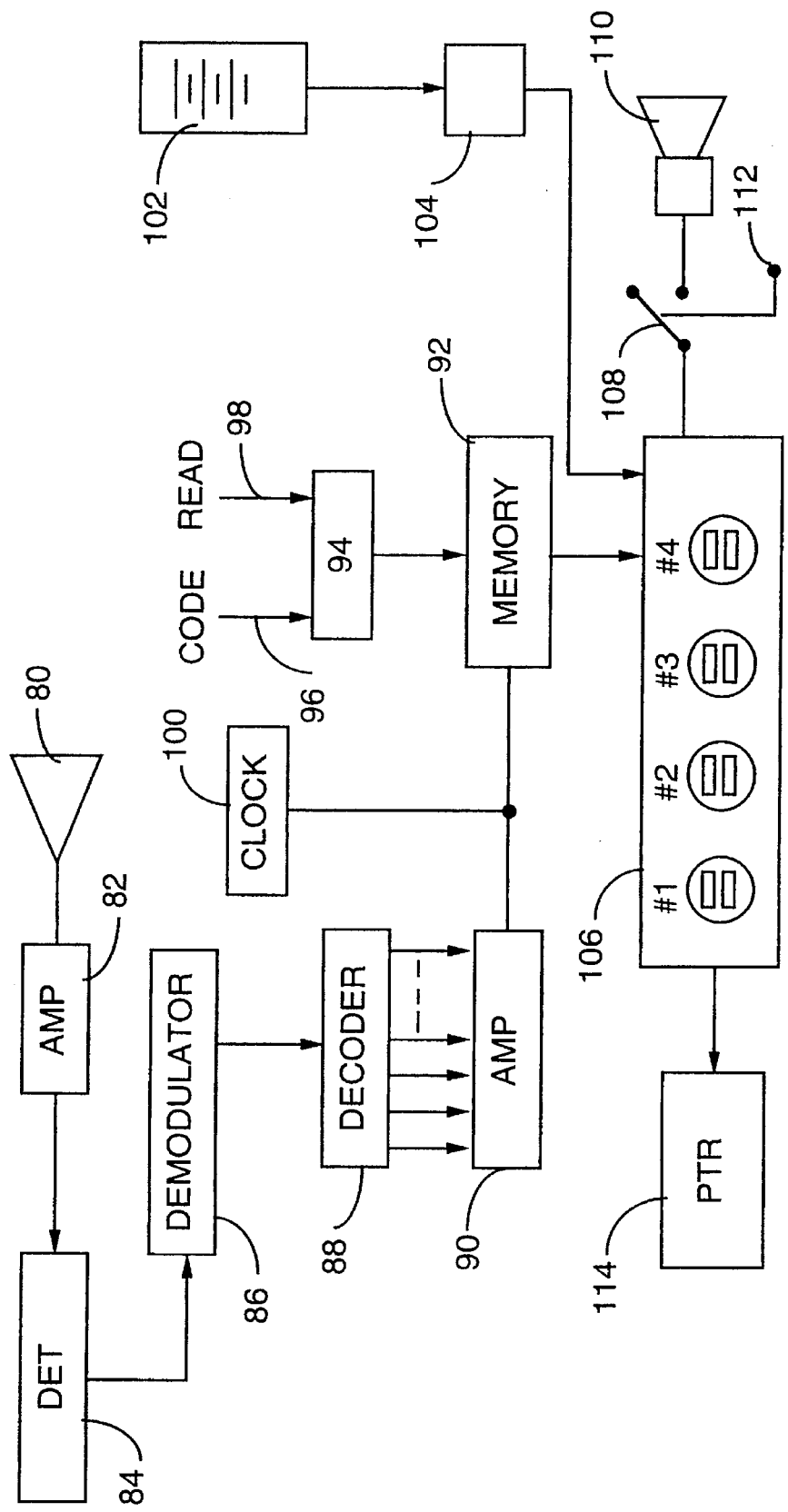
FIG. 5 is a diagrammatical illustration of the electrical circuitry for the receiver unit forming part of the present invention.

In FIG. 5 there is illustrated a preferred embodiment of a receiver which is used to detect radio frequency transmissions by monitors forming part of the surveillance system. It is to be understood that the output of the radio frequency system of each monitor is relatively low so that the receiver can be placed remotely to the surveillance field to avoid the need for a sportsman to enter the area thus leaving tail tale scent. It is preferred that the receiver circuitry is housed in a water-proof casing and provided with suitable mounting structure so that it can be securely placed in the surveillance area without continued attendance by the sportsman. The receiver includes an antenna 80 responsive to the RF signal by all monitors. The antenna supplies a signal to amplifier 80 whose output is delivered to a detector 84. The detector provides a threshold level for a surveillance signal which is applied to a demodulator 86. Once freed of the carrier wave the output from the demodulator is fed to a decoder 88 that produces an electrical signal uniquely identifying the infrared beam which has been detected and transmitted by a monitor. The output signal of the decoder is amplified by amplifier 90 and thence fed to a memory 92. The memory is accessed by an input terminal 94 having a required code entry line 96 and a read line 98. The output signal from amplifier 90 is also connected to a clock 100 which provides an input to the memory 92 of time and date information with each occurrence at the signal appearing at the output 90. A battery 102 provides a resident power supply for the receiver which is provided with an in line monitor 104 of battery life. The monitor 104 has an output line connected to an alarm such as included in display 106. The display is preferably lighted and provided with alpha-numeric display areas that are chosen to provide the desired displays corresponding to information recovered from the memory as well as battery life. There is preferably provided an output line 108 from the display which is connected to a speaker 110 and provided with a suitable phone jack 112 for use with person ear-phone when desired. The display is also preferably provided with a jack that will permit the signals displayed to be supplied to a printer 114.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. An apparatus for recording the presence of an infrared reflective animal in a surveillance area, said apparatus including:

at least one monitor means including an IR transmitter and IR receiver responsive to incident IR radiation reflected by the animal to said IR receiver for producing an infrared receiver output signal, said monitor means further including an radio frequency transmitter responsive to said infrared receiver output signal for transmitting a radio frequency signal indicative of the presence of an animal in said surveillance area;

a radio frequency receiver responsive to said radio frequency signal by said monitor at a site remote to said surveillance area for generating a corresponding electrical signal, said radio frequency receiver further including means for displaying indicia corresponding to the occurrence of each transmission of a radio frequency signal by said monitor without inhabiting the wild habitat of the surveillance area; and means for controlling access to said electrical signal generated by said radio frequency receiver.

2. The apparatus according to claim 1 wherein said means for displaying indicia include an alphanumeric display.

3. The apparatus according to claim 1 wherein said means for displaying indicia include a speaker for an audio signal.

4. The apparatus according to claim 1 wherein said monitor means includes a plurality of infrared transmitters for transmitting infrared radiation and a plurality of detector means for detecting reflected infrared radiation from said infrared transmitters, and means for modulating infrared radiation transmitted by said infrared transmitters with identifying indicia to uniquely identify each of said plurality of infrared transmitters.

5. The apparatus according to claim 1 wherein said monitor means further include switch means for turning ON and OFF each infrared transmitter and associated detector means.

6. The apparatus according to claim 1 wherein said radio frequency receiver includes means for storing said electrical signals and means for accessing said means for storing to provide a read-out of occurring electrical signals from said means for storing.

7. The apparatus according to claim 1 further including a camera controllable in response to a detection signal corresponding to detected infrared radiation from an animal within the surveillance area.

8. The apparatus according to claim 1 wherein said radio frequency receiver further includes means for delivering said electrical signal to a printer, said printer forming said means for displaying indicia.

* * * * *